US012566091B2

(12) United States Patent (10) Patent No.: US 12,566,091 B2
Robertson et al. (45) Date of Patent: Mar. 3, 2026

(54) PASSIVE INFRARED SENSOR OCCUPANCY DETECTOR, MICROCONTROLLER AND METHODS OF OPERATION

(71) Applicant: Texas Instruments Incorporated, Dallas, TX (US)

(72) Inventors: Maxwell G. Robertson, Dallas, TX (US); Miroslav Oljaca, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 894 days.

(21) Appl. No.: 17/688,644

(22) Filed: Mar. 7, 2022

(65) Prior Publication Data

US 2022/0364925 A1      Nov. 17, 2022

Related U.S. Application Data

(60) Provisional application No. 63/158,532, filed on Mar. 9, 2021.

(51) Int. Cl.
| | |
|---|---|
| *G01J 5/34* | (2022.01) |
| *G01J 5/00* | (2022.01) |
| *G01J 5/02* | (2022.01) |

(52) U.S. Cl.
CPC .......... *G01J 5/0025* (2013.01); *G01J 5/0205* (2013.01); *G01J 5/34* (2013.01)

(58) Field of Classification Search
CPC .......... G01J 5/0025; G01J 5/0205; G01J 5/34
See application file for complete search history.

(56) References Cited

U.S. PATENT DOCUMENTS

| | | | |
|---|---|---|---|
| 8,384,552 B2 | 2/2013 | Pauly et al. | |
| 8,809,788 B2 | 8/2014 | Covaro | |
| 11,118,804 B2 * | 9/2021 | Kwong | G05B 13/048 |
| 11,346,977 B2 * | 5/2022 | Ikeda | G01J 5/0275 |
| 2010/0162285 A1 | 6/2010 | Cohen et al. | |
| 2010/0259383 A1 | 10/2010 | Botha | |

OTHER PUBLICATIONS

International Search Report and Written Opinion received for PCT application No. PCT/US2022/019541 mailed Jun. 16, 2022, 7 pages.

* cited by examiner

*Primary Examiner* — David P Makiya
*Assistant Examiner* — Fani Polyzos Boosalis
(74) *Attorney, Agent, or Firm* — Michelle F. Murray; Frank D. Cimino

(57) ABSTRACT

A device for occupancy detection of a space includes a passive infrared (PIR) sensor having a fixed field of view; an infrared reflector positioned proximate to the PIR sensor for re-directing infrared radiation received from within the space toward the PIR sensor; an electromechanical device coupled to the infrared reflector and operative to alter a pointing angle thereof in response to a control signal; and, detection and control circuitry (or a microcontroller), coupled to the PIR sensor and the electromechanical device, operative to receive a signal from the PIR sensor indicative of motion of a person within the space, and further operative to selectively alter the pointing angle of the infrared reflector, using the electromechanical device, whereby the relative position of the person is shifted within the fixed field of view of the PIR sensor, thereby simulating motion of the person even when stationary.

33 Claims, 5 Drawing Sheets

| DISTANCE [INCH] | $V_{pp}$ [V] |
|---|---|
| 30 | 3,14 |
| 70 | 1,42 |
| 90 | 0,92 |
| 130 | 0,42 |

PASSIVE INFRARED SENSOR OCCUPANCY DETECTOR, MICROCONTROLLER AND METHODS OF OPERATION

RELATED APPLICATION

This application claims the benefit of U.S. Provisional Patent Application No. 63/158,532, filed Mar. 9, 2021, the disclosure of which is incorporated herein by reference.

TECHNICAL FIELD

This disclosure is directed, in general, to occupancy detectors and, more specifically, to a device utilizing a passive infrared (PIR) sensor for occupancy detection and a related microcontroller and method.

BACKGROUND

Occupancy sensors are devices that detect when a space is occupied and, for example, automatically turn on the lights (or trigger some other action); conversely, the device can turn off the lights if it is determined the space is not occupied, thus saving energy. According to the Lawrence Berkeley National Laboratory, occupancy-based strategies can produce average lighting energy savings of 24%. Due to their relative simplicity and potential energy-savings, coupled with energy code mandates, occupancy sensors are a staple in new construction and retrofit projects.

Modern buildings are installing intelligence for energy and system efficiency through wireless sensor nodes. These sensor nodes must maintain a long battery life (up to 10 years preferably) while constantly monitoring key parameters such as temperature, humidity, occupancy. In building automation, occupancy sensors are incorporated in an overall system, including comfort control to airflow control in heating, ventilation, and air conditioning (HVAC) systems as well as lighting, safety, and security. Motion detectors containing one PIR sensor, a Fresnel lens with a cone-type beam, and a binary output are very efficient for detecting any type of motion, including a human or pet. Because of this, PIR sensors are commonly used in motion detector applications but are not typically used for occupancy detection devices. Typical methods of occupancy detection involve more complex and expensive modalities such as optical time of flight or millimeter wave sensing.

Referring to FIG. 1, illustrated is the general structure of a conventional PIR sensor 100. PIR sensor 100 includes a hermetically-sealed metal can 110 to shield first and second pyroelectric sensor elements 121 and 122 from humidity. There is a window and/or lens 130 made of IR-transmissive material (typically coated silicon) that also protects the sensor elements. The PIR sensor 100 has a limited field of view 140 defined by the packaging geometry and whether it includes a lens. When the sensor is idle, both sensor elements 121 and 122 detect the same amount of IR, the ambient amount radiated from the room or walls or outdoors. When a warm body like a human or animal passes, the IR emissions from the body first strikes one half of the PIR sensor 100, which causes a positive differential change between the two sensor elements 121 and 122. When the warm body leaves the sensing area, the reverse happens, whereby the sensor generates a negative differential change. These change pulses are what is detected.

The PIR sensor 100 further includes circuitry 150 coupled to the pyroelectric sensor elements 121 and 122 for generating an electrical output signal $V_{IR}$ in response to infrared radiation striking the sensor elements; the output signal $V_{IR}$ can have a typical peak-to-peak voltage of ~3.6 millivolts ($mV_{pp}$). The sensor elements 121, 122 can be calibrated, for example, to be sensitive to human heat wavelengths (i.e., 8-14 µm); they detect a person, however, only if the human is moving.

Referring now to FIG. 2, illustrated are the operational characteristics of PIR sensor 100 for a person moving relative to the sensor. The output signal characteristics of the PIR sensor 100 can vary as a function of the direction of movement of the person, distance of the person from the sensor, and the speed at which the person is moving, as shown in graphs 200-A, 200-B and 200-C, respectively. For example, a person moving left to right (i.e., "direction 1") relative to the sensor elements 121, 122, will generate a first signal 201; and, when moving right to left (i.e., "direction 2") will generate a second signal 202. The signals 201 and 202 have the same waveform but vary in time as a function of which of the sensor elements 121, 122 first detects the person. Similarly, the amplitude of the signal from sensor 100 will vary with the distance of the person from the sensor, as illustrated by signals 211 and 212 in graph 200-B; example peak-to-peak voltage values for the signals, as a function of distance from the sensor, are indicated in table 213. Finally, the output signal can vary with the speed at which the person is moving, as illustrated by signals 221 ("speed 1") and 222 ("speed 2") in graph 200-C.

The design of PIR sensors is such that only fairly rapid changes in temperature of an object compared with background temperature will raise an alarm. Thus, although acceptable for use as a motion sensor, they are less practical for use in occupancy sensors, which should be able to detect the presence of a person, even if the person is stationary. Due to their low cost and power demands, however, it would be advantageous to devise an occupancy sensor utilizing a PIR sensor, rather than more expensive and complex technologies.

SUMMARY

To address deficiencies of the prior art, disclosed is a device for occupancy detection of a space using a passive infrared (PIR) sensor having a fixed field of view; the PIR sensor includes at least two pyroelectric infrared elements. The device includes an infrared reflector positioned proximate to the PIR sensor for re-directing infrared radiation received from within a monitored space toward the PIR sensor; an electromechanical device coupled to the infrared reflector and operable to alter a pointing angle thereof in response to a control signal; and, detection and control circuitry (or a microcontroller), coupled to the PIR sensor and the electromechanical device, operable to receive a signal from the PIR sensor indicative of motion of a person within the monitored space, and further operable to selectively alter the pointing angle of the infrared reflector, using the electromechanical device, whereby the relative position of the person is shifted within the fixed field of view of the PIR sensor, thereby simulating motion of the person even when stationary. A method of operation for the device, which can be embodied in a microcontroller, is also disclosed.

In an example, a nominal pointing angle of the infrared reflector is 45 degrees from the line normal to the PIR sensor. In a related example, selectively altering the pointing angle comprises periodically panning the infrared reflector in a first direction away from a nominal pointing angle if motion of a person has not been detected for a predefined wait time. If panning the infrared reflector in the first direction does not cause the PIR sensor to generate a signal indicative of motion of the person, the infrared reflector is panned in a second direction away from the nominal pointing angle; the first and second directions can be, for example, left and right. If panning the infrared reflector in the first or second direction causes the PIR sensor to generate a signal indicative of motion of the person, the controller circuitry is operative to generate a signal indicating the space is occupied. If panning the infrared reflector in the first or second direction does not cause the PIR sensor to generate a signal indicative of motion of the person, the controller circuitry is operative to put the device in a standby state.

In an example, the standby state comprises positioning the infrared reflector to the nominal pointing angle. In a related example, the standby state has a predefined duration. In this example, the controller circuitry, at the expiration of the predefined duration, resumes selectively altering the pointing angle of the infrared reflector. The PIR sensor is preferably operable to detect motion during the standby state.

The foregoing has outlined, rather broadly, the general features of the disclosed examples so that those skilled in the art may better understand the detailed description of the examples that follows. Those skilled in the art should appreciate that they can readily use the disclosed conception and example as a basis for designing or modifying other structures and methods for carrying out the same purposes of the present disclosure. Those skilled in the art should also realize that such equivalent constructions do not depart from the spirit and scope of the disclosure in its broadest form.

BRIEF DESCRIPTION OF THE DRAWINGS

For a more complete understanding of the disclosure, reference is made to the following detailed description taken in conjunction with the accompanying drawings, in which.

DETAILED DESCRIPTION

Figure 3:
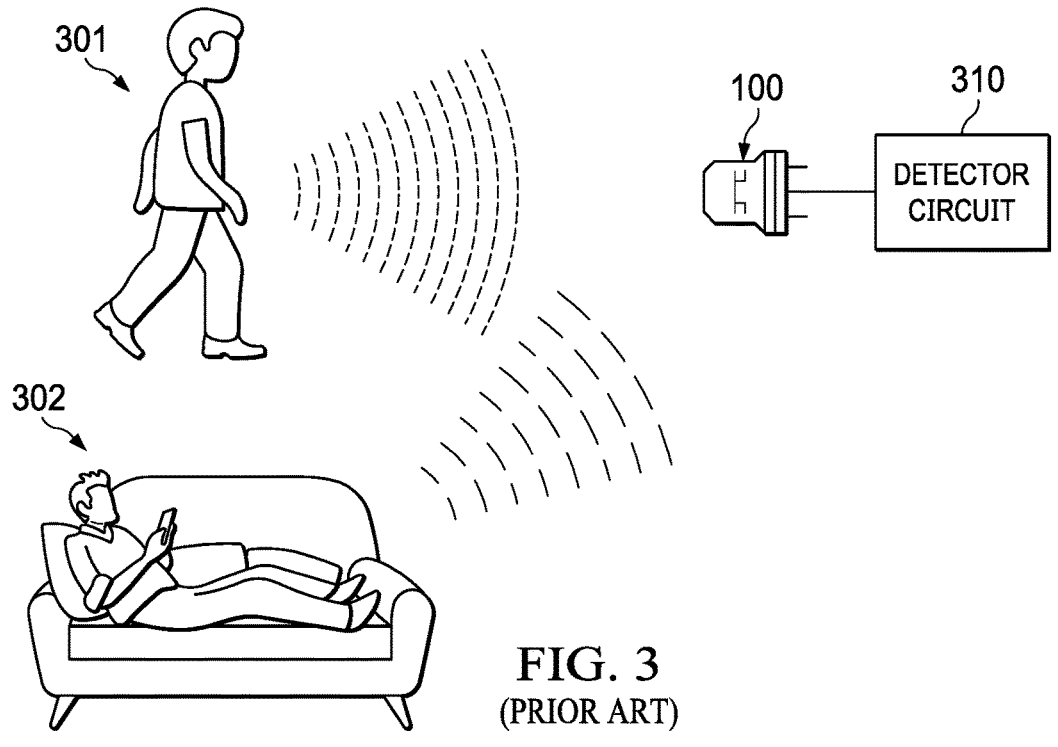
FIG. 3 illustrates the challenge of using a PIR sensor for an occupancy detector.

FIG. 3 illustrates the challenge of using a PIR sensor for an occupancy detector. As noted supra, PIR sensors output a voltage dependent on the degree of infrared radiation they receive. They are commonly used for motion detection, since when a warm-bodied person 301 passes through the sensor's field of view the output voltage is disturbed beyond its baseline level (which otherwise drifts based on background radiation and other factors). When the person is not moving 302, however, there is no change in the received IR signal and it is difficult to distinguish the IR signal of the person from the baseline IR level of the monitored space.

For a PIR motion sensing device, a detector circuit 310 is coupled to, and receives a voltage signal from, the PIR sensor 100. The detector circuit 310 can be, for example, a discrete analog or an integrated digital implementation. In a typical discrete analog implementation, the PIR sensor 100 output is scaled and filtered through multiple op-amp stages within detector circuit 310; this helps to ensure a large enough signal amplitude and to focus the detection only on frequency ranges likely to correspond to human motion. The processed waveform then goes to a comparator stage which toggles a digital logic output to alert a system that voltage deviations have exceeded a configured sensitivity threshold and that motion had occurred within the monitored space. With the right component selection, standby currents can be below 2 uA. For an integrated digital implementation, the PIR sensor waveform can be acquired by an ADC input of a microcontroller, then digital signal processing algorithms are applied to filter for human motion and determine whether or not motion had occurred. Overall current consumption can still be kept low (e.g., <10 uA) with this approach since the low frequencies of motion signals allow for very low sample rates (e.g., 20 samples/sec). This allows the system to spend the vast majority of time (>99%) in a low-power sleep state. Some analog signal conditioning, however, may be required to interface to the PIR sensor 100. One example of a suitable microcontroller for an integrated digital implementation is Texas Instruments MSP430FR2355 MCU.

Figure 4:
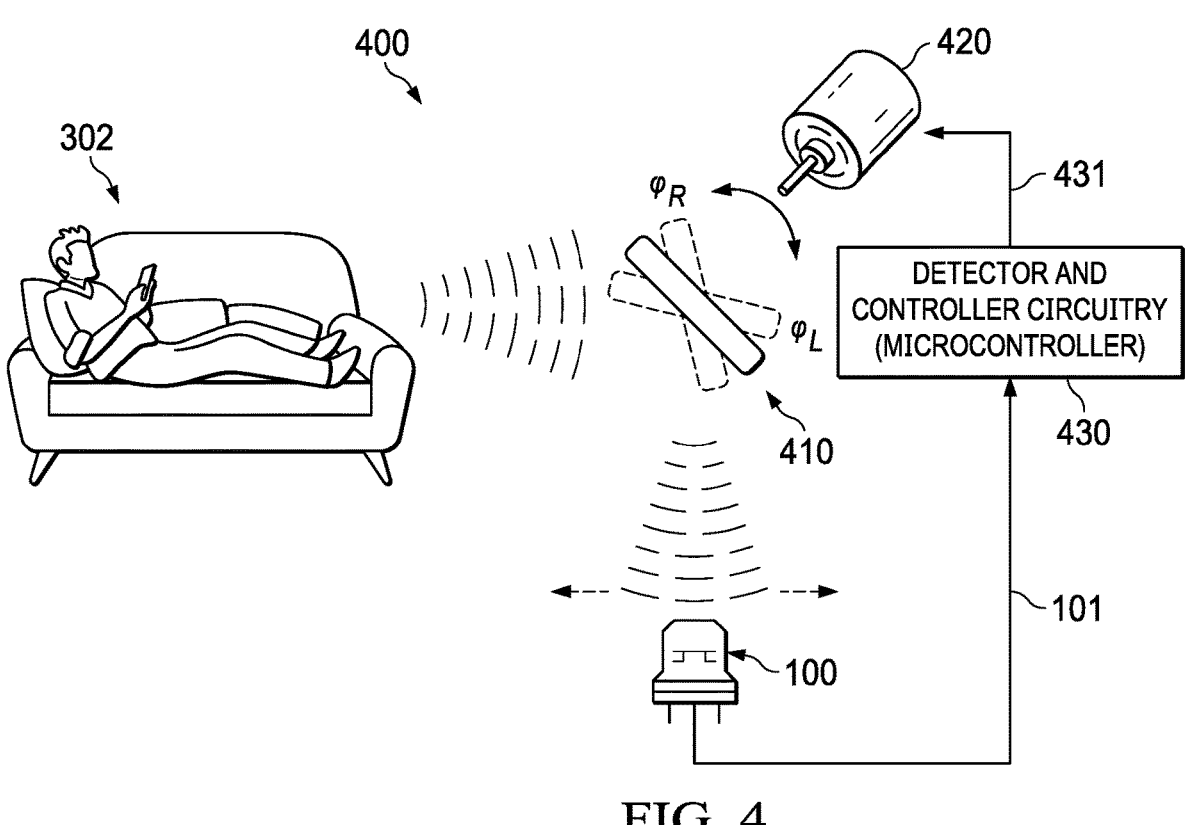
FIG. 4 illustrates a device architecture for an occupancy detector utilizing a PIR sensor having a fixed field of view and a controllable-angle infrared reflector.

Turning now to FIG. 4, illustrated is an occupancy detection device architecture 400 for an occupancy detector utilizing a PIR sensor 100 having a fixed field of view and a controllable-angle infrared reflector 410. Rather than relying on the motion of the target, such as stationary person 302, to create an alternating infrared profile through the sensor's fixed field of view, the monitored space can be periodically swept by an infrared reflector 410, positioned proximate to the PIR sensor 100 for re-directing infrared radiation received from within the monitored space toward the PIR sensor. An electromechanical device 420, such as a micromotor, is coupled to the infrared reflector and operative to alter a pointing angle thereof in response to a control signal 431 from detector and controller circuitry 430; the detector and controller circuitry can be, for example, integrated together in a microcontroller, such as one from Texas Instruments' MSP430 family of microcontrollers; the highly integrated smart analog combo functions of MSP430 microcontrollers can be used for conditioning and processing of a signal 101 received from PIR sensor 100, as well as for control of the electromechanical device 420, via a signal 431, for altering the pointing angle of the infrared reflector 420; an example of a control scheme is described hereinafter with reference to FIG. 6. Altering the pointing angle of the infrared reflector 410 redirects infrared waves from the monitored space to the PIR sensor 100, shifting the view perceived the sensor left or right, which results in a received IR signal comparable to that of a moving target being received by a stationary sensor. Thus, the occupancy detection device architecture 400 relies on a single standard analog PIR sensor 100, rather than more complex electronics known in the art.

Figure 1:
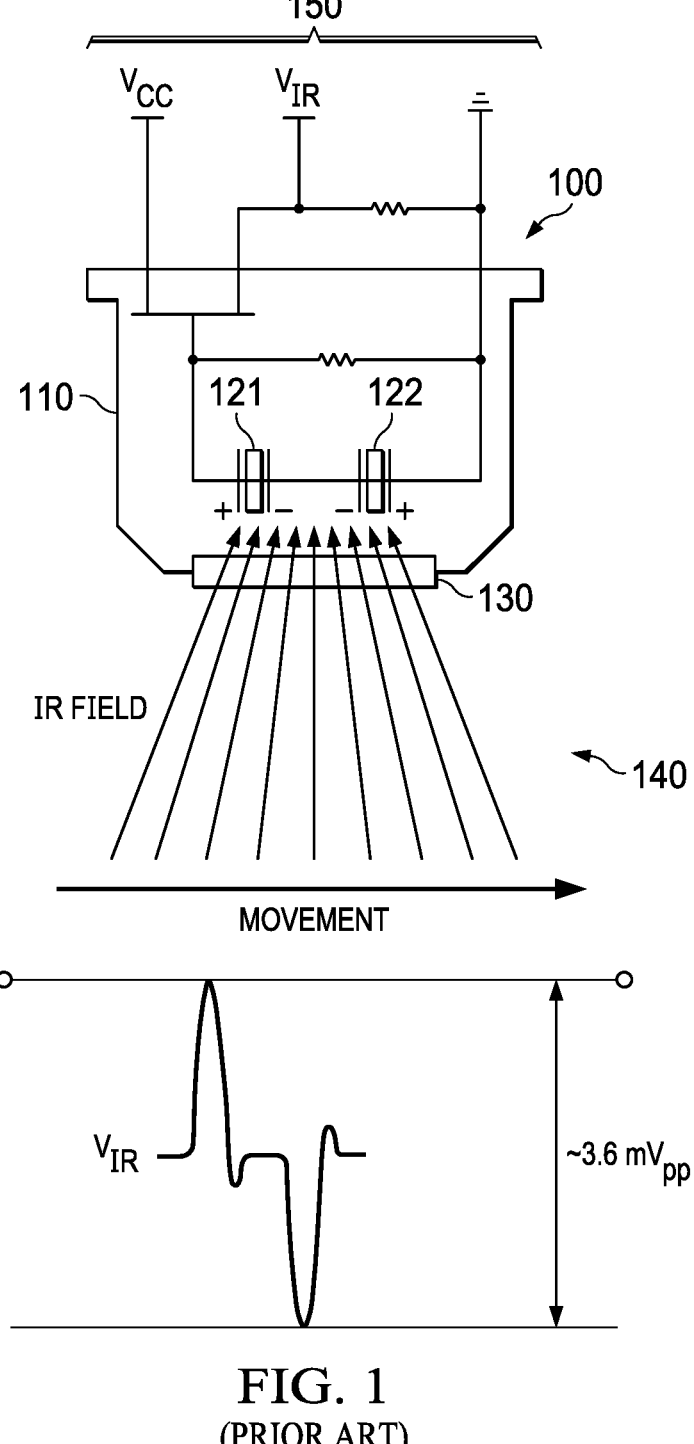
FIG. 1 illustrates the general structure of a passive infrared (PIR) sensor.
Figure 2:
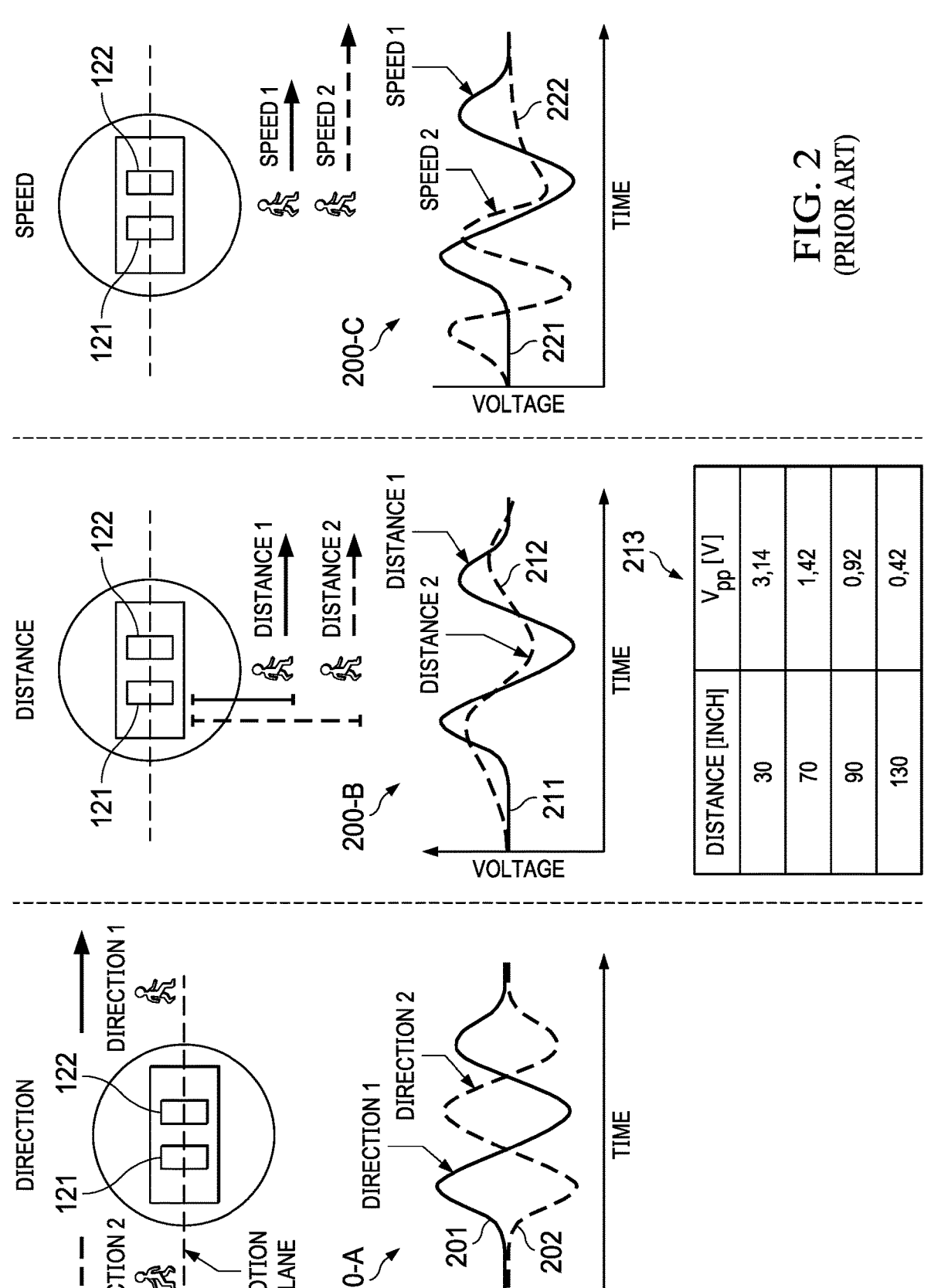
FIG. 2 illustrates the operational characteristics of a PIR sensor.
Figure 5:
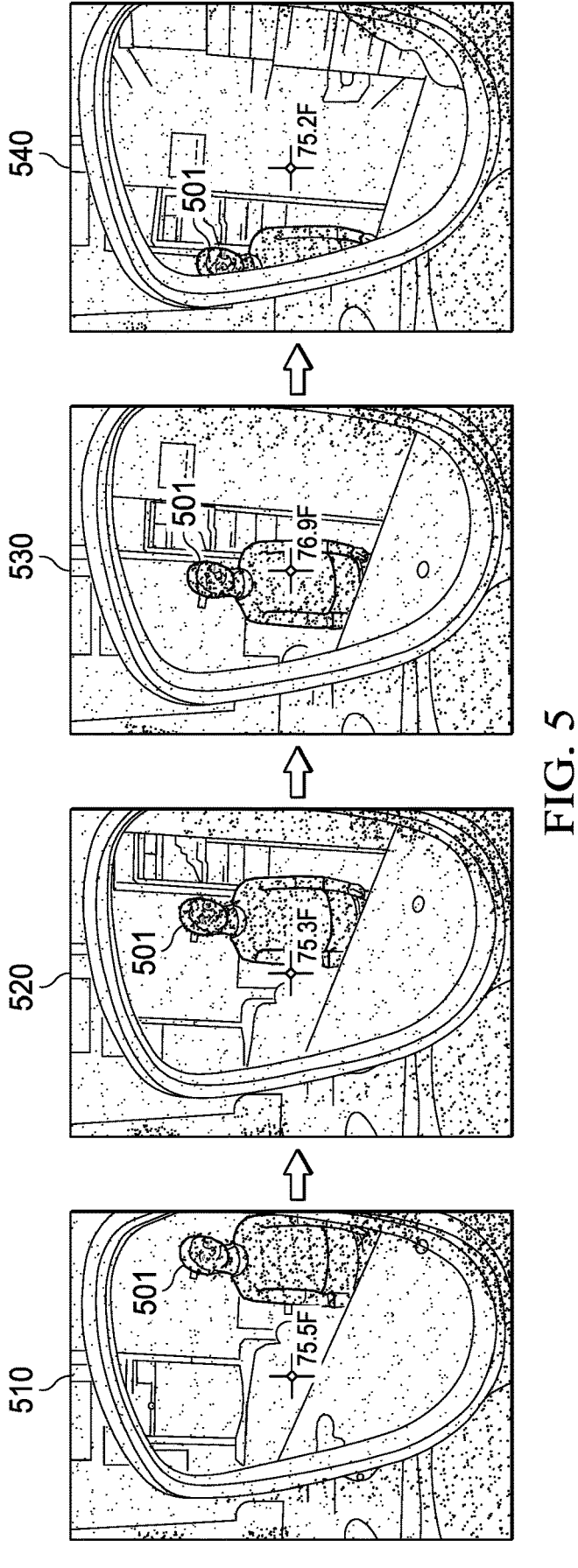
FIG. 5 illustrates example infrared reflections from a controllable-angle infrared reflector.

Referring now to FIG. 5, illustrated are example infrared reflections from a controllable-angle infrared reflector 410, as perceived by a PIR sensor 100 having a fixed field of view, as the pointing angle of the reflector is panned from left to right, causing a stationary person 501 to be perceived by the sensor as moving from right to left in the sequence of images 510, 520, 530 and 540, respectively. From the perspective of the PIR sensor 100, and associated detection circuitry, the relative position of the person 501 is shifted within the fixed field of view of the PIR sensor, thereby simulating motion of the person—even when stationary. The artificial movement of the person 501 as perceived by the PIR sensor (and associated detection circuitry) triggers a sensor response similar to that of a person walking perpendicular to a stationary sensor, as illustrated by signals 201 and 202 in FIG. 2.

Figure 6:
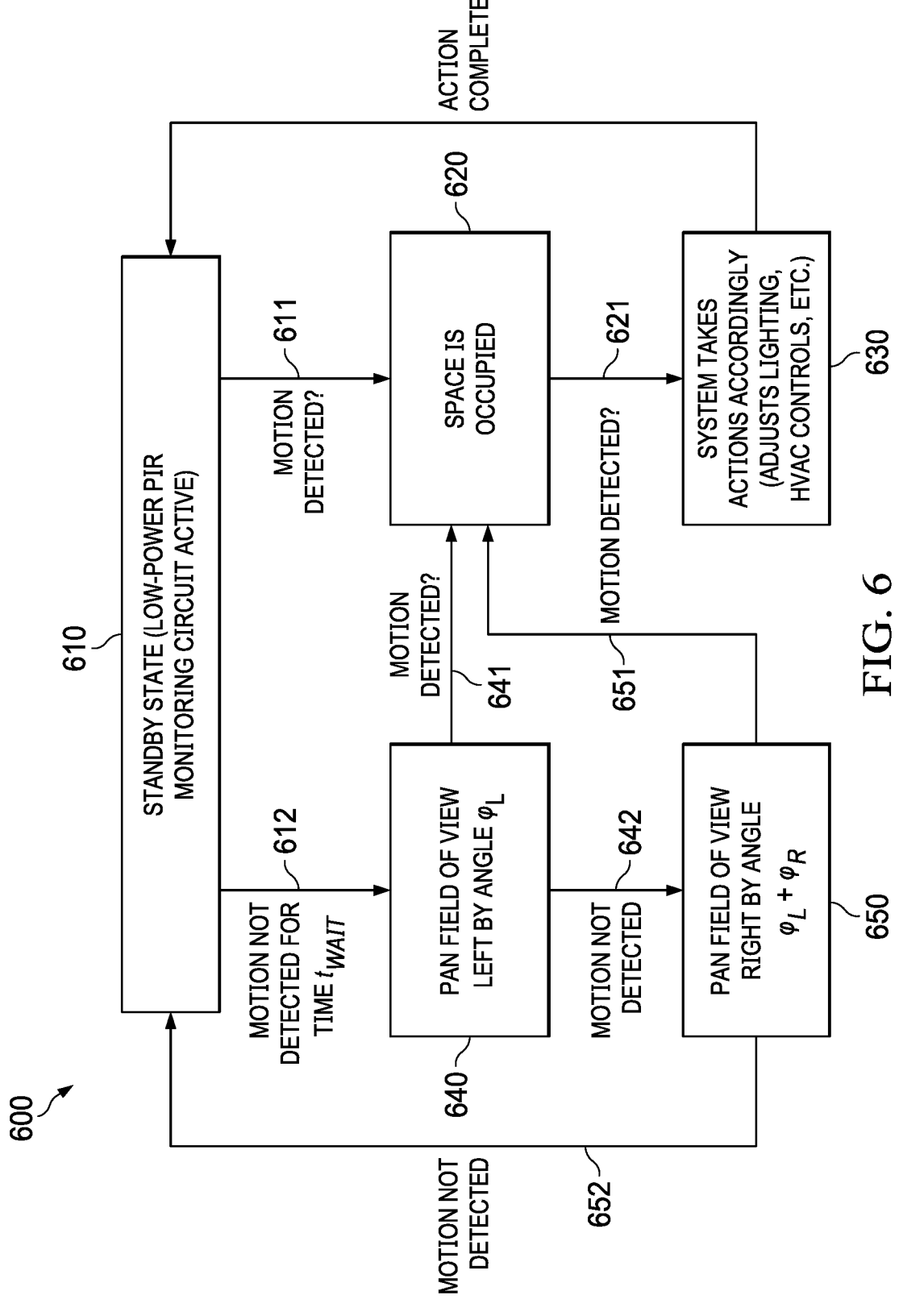
FIG. 6 illustrates an example control scheme an occupancy detector.

Finally, referring to FIG. 6, illustrated is an example control scheme 600 (or "state diagram") for an occupancy detector utilizing a PIR sensor 100 having a fixed field of view and a controllable-angle infrared reflector 410, as illustrated in FIG. 4; the control scheme can be implemented in, for example, detector and controller circuitry 430. The control scheme 600 is characterized by various states, and responses/actions causing the transition between states, dependent on the output signal from PIR sensor 100 and the pointing angle of infrared reflector 410.

Starting in state 610 ("standby state"), the PIR sensor 100 is active and any associated detector circuitry of detector and controller circuitry 430 is operational; this is a low-power state wherein preferably only the minimal amount of circuitry is enabled. In state 610, the infrared reflector 410 is also preferably positioned to a nominal pointing angle; for example, the nominal pointing angle of the infrared reflector 410 is set to be 45 degrees from the line normal to the PIR sensor 100.

While in the standby state 610, if motion of an object (i.e., a person) is detected 620, indicating the space is occupied, the controller moves to a state 620, which can be used to trigger, via a signal 621, an action 630, such as turning on lighting or adjusting an HVAC thermostat. Once the triggered action is completed, the control scheme returns to the standby state 610. If further motion of the person is detected, the control scheme again steps through state 620 and performs any programmed actions. If, however, no motion is detected for a predefined time (i.e., no signal is received from PIR sensor 100 indicative of motion of the person within the monitored space), it is possible that the previously-perceived person moved to a location within the space outside the field of view of the PIR sensor 100. Or it is possible that the person is still within the field of view of the PIR sensor 100 but is stationary—and, thus, not triggering a signal from the PIR sensor indicative of the person's continued presence. In either case, the control scheme 600, in the absence of a signal indicative of continued occupancy for a predefined wait time ($t_{WAIT}$), generates a signal for the electromechanical device 420 to alter the pointing angle of the infrared reflector 410.

In the example control scheme 600, in the absence of a signal from the PIR sensor 100 indicative of continued occupancy for the predefined time ($t_{WAIT}$), the infrared reflector is rotated to the right 640, thus shifting the field of view of the PIR sensor to the left by an angle $\varphi_L$ (as described supra with respect to FIG. 5). If motion is still not detected 642, the infrared reflector 410 is rotated to the left, shifting the field of view of the PIR sensor to the right by an angle $\varphi_R$. In this example, $\varphi_L$ can be equal to $\varphi_R$, which means the field of view of the PIR sensor would be panned by equal measures to the left and right, thus expanding the nominal field of view of PIR sensor 100. In addition to expanding the nominal field of view, panning the field of view in the absence of detected motion will alter the relative position of the person within the fixed field of view of the PIR sensor (if still occupying the room), thereby simulating motion of the person even when stationary.

The example control scheme 600 can be modified as desired to balance the time to confirm occupancy of a monitored space against increased power of the device. For example, the predefined wait time ($t_{WAIT}$) can be lengthened, which will delay confirmation of continued occupancy, but will reduce device power consumption. Similarly, the selective altering of the pointing angle of the infrared reflector can be iteratively and/or progressively performed to the left, then the right, or alternately to the left and right by progressively greater angles, to fully sweep the monitored space. An increase in the frequency of altering the pointing angle of the infrared reflector 410, however, will increase the power demands of the controller circuitry of detector and controller circuitry 430 and the electromechanical device 420. Such concerns about power demands, however, are generally only relevant with respect to battery-powered occupancy detectors.

The technical principles disclosed herein provide a foundation for designing occupancy detection devices utilizing a single PIR sensor. The examples presented herein illustrate the application of the technical principles and are not intended to be exhaustive or to be limited to the specifically-disclosed circuit topologies or methods of operation; it is only intended that the scope of the technical principles be defined by the claims appended hereto, and their equivalents.

We claim:

1. A device comprising:
a passive infrared (PIR) sensor having a fixed field of view;
an infrared reflector positioned proximate to the PIR sensor, the infrared reflector configurable to re-direct received infrared radiation toward the PIR sensor;
an electromechanical device coupled to the infrared reflector and configurable to alter a pointing angle of the infrared reflector based on a control signal; and
circuitry coupled to the PIR sensor and to the electromechanical device, wherein the circuitry is configurable to:
receive a signal from the PIR sensor, the signal indicative of a presence or absence of motion; and
based on the signal indicating a lack of motion for a predefined wait time, provide the control signal to selectively alter the pointing angle of the infrared reflector, using the electromechanical device, thereby simulating motion.

2. The device recited in claim 1, wherein a nominal pointing angle of the infrared reflector is 45 degrees from normal to the PIR sensor.

3. The device recited in claim 1, wherein the circuitry is configurable to provide the control signal such that, when panning the infrared reflector in a first direction does not cause the PIR sensor to generate a signal indicative of motion, the control signal pans the infrared reflector in a second direction opposite the first direction.

4. The device recited in claim 3, wherein the first direction is left and the second direction is right.

5. The device recited in claim 3, wherein when panning the infrared reflector in the first or second direction causes the PIR sensor to generate a signal indicative of motion, the circuitry is configurable to generate a signal indicating space is occupied.

6. The device recited in claim 3, wherein when panning the infrared reflector in the first or second direction does not cause the PIR sensor to generate a signal indicative of motion, the circuitry is configurable to put the device in a standby state.

7. The device recited in claim 6, wherein the standby state comprises positioning the infrared reflector to a nominal pointing angle.

8. The device recited in claim 7, wherein the PIR sensor is configurable to detect motion during the standby state.

9. The device recited in claim 6, wherein the standby state has a predefined duration.

10. The device recited in claim 9, wherein the circuitry is configurable to, at an expiration of the predefined duration, resume selectively altering the pointing angle of the infrared reflector.

11. The device recited in claim 1, wherein the PIR sensor comprises at least two pyroelectric infrared elements.

12. A method comprising:

receiving, by a detector circuit, a signal from a passive infrared (PIR) sensor, the signal indicative of motion; and based on the signal not indicating motion for a wait time, generating, by a control circuit, a control signal to control an electromechanical device coupled to an infrared reflector to selectively alter a pointing angle of the infrared reflector, using the electromechanical device, whereby a relative position is shifted within a fixed field of view of the PIR sensor.

13. The method recited in claim 12, wherein a nominal pointing angle of the infrared reflector is 45 degrees from normal to the PIR sensor.

14. The method recited in claim 12 further comprising, based on panning the infrared reflector in a first direction not causing the PIR to generate a signal indicative of motion, panning the infrared reflector in a second direction.

15. The method recited in claim 14, wherein the first direction is left and the second direction is right.

16. The method recited in claim 14 further comprising, based on panning the infrared reflector in the first or second direction causing the PIR to generate a signal indicative of motion, generating a signal indicating a space is occupied using the control circuit.

17. The method recited in claim 14, further comprising, if based on panning the infrared reflector in the first or second direction not causing the PIR to generate a signal indicative of motion, causing the control circuit to enter a standby state.

18. The method recited in claim 17, wherein the standby state comprises positioning the infrared reflector to a nominal pointing angle.

19. The method recited in claim 18, further comprising the PIR sensor detecting motion during the standby state.

20. The method recited in claim 17, wherein the standby state has a predefined duration.

21. The method recited in claim 20, further comprising the control circuit, at an expiration of the predefined duration, resuming selectively altering the pointing angle of the infrared reflector.

22. A microcontroller comprising:

detector circuitry configurable to receive a signal from a passive infrared (PIR) sensor indicative of motion; and, controller circuitry configurable to, based on motion having not been detected for a wait time, generate a signal to control an electromechanical device coupled to an infrared reflector to selectively alter a pointing angle of the infrared reflector, using the electromechanical device, whereby a relative position is shifted within a fixed field of view of the PIR sensor.

23. The microcontroller recited in claim 22, wherein the controller circuitry is configurable to nominally adjust the pointing angle to be 45 degrees from normal to the PIR sensor.

24. The microcontroller recited in claim 22, wherein, when panning the infrared reflector in a first direction does not cause the PIR to generate a signal indicative of motion, generating a signal to pan the infrared reflector in a second direction.

25. The microcontroller recited in claim 24, wherein, when panning the infrared reflector in the first or second direction causes the PIR to generate a signal indicative of motion, the control circuitry is configurable to generate a signal indicating space is occupied.

26. The microcontroller recited in claim 24, wherein, when panning the infrared reflector in the first or second direction does not cause the PIR to generate a signal indicative of motion, the controller circuitry is configurable to enter a standby state.

27. The microcontroller recited in claim 26, wherein the standby state comprises generating a signal to position the infrared reflector to a nominal pointing angle.

28. The microcontroller recited in claim 26, wherein the standby state has a predefined duration.

29. The microcontroller recited in claim 28, wherein the control circuitry is configurable to resume selectively altering the pointing angle at an expiration of the predefined duration.

30. The microcontroller recited in claim 28, wherein the detector circuitry is configurable to receive and process a signal from a PIR sensor during the standby state.

31. A device comprising:

detector circuitry configurable to:

receive a first signal from a sensor;

detect motion using the first signal; and detect an interval of time in which no motion is detected using the first signal; and control circuitry coupled to the detector circuitry and configurable to, based on the motion and the interval of time in which no motion is detected, provide a control signal configured to change a field of view of the sensor.

32. The device of claim 31, wherein the control circuitry is configured to change the field of view of the sensor by:

changing the field of view in a first direction; and based on the changing in the first direction not causing the detector circuitry to detect motion using the first signal, changing the field of view in a second direction.

33. The device of claim 31, wherein the control signal is configured to cause a motor coupled to a reflector to change the field of view of the sensor.

* * * * *